US008855040B1

(12) United States Patent
Gossett et al.

(10) Patent No.: US 8,855,040 B1
(45) Date of Patent: Oct. 7, 2014

(54) CROSS-CELL MIMO

(75) Inventors: Carroll Philip Gossett, Mountain View, CA (US); Michial Allen Gunter, Oakland, CA (US)

(73) Assignee: Google Inc., Mountain View, CA (US)

(*) Notice: Subject to any disclaimer, the term of this patent is extended or adjusted under 35 U.S.C. 154(b) by 1222 days.

(21) Appl. No.: 12/244,376

(22) Filed: Oct. 2, 2008

Related U.S. Application Data

(60) Provisional application No. 61/046,694, filed on Apr. 21, 2008.

(51) Int. Cl.
*H04B 7/14* (2006.01)
*H04W 4/00* (2009.01)

(52) U.S. Cl.
USPC .......................................... 370/315; 370/331

(58) Field of Classification Search
USPC .......................................................... 370/315
See application file for complete search history.

(56) References Cited

U.S. PATENT DOCUMENTS

| | | | |
|---|---|---|---|
| 5,864,545 A | 1/1999 | Gonikberg et al. | |
| 6,829,289 B1 | 12/2004 | Gossett et al. | |
| 7,142,536 B1 | 11/2006 | Gossett et al. | |
| 7,711,035 B2 | 5/2010 | Cairns et al. | |
| 8,005,160 B2* | 8/2011 | Steer et al. | 375/267 |
| 8,130,881 B1 | 3/2012 | Gossett et al. | |
| 8,381,056 B2* | 2/2013 | Taori et al. | 714/748 |
| 2004/0096022 A1 | 5/2004 | Zhang | |
| 2005/0047482 A1 | 3/2005 | Gossett et al. | |
| 2007/0081483 A1* | 4/2007 | Jang et al. | 370/315 |
| 2007/0129008 A1* | 6/2007 | Shi et al. | 455/11.1 |
| 2008/0056173 A1* | 3/2008 | Watanabe | 370/315 |
| 2008/0109635 A1* | 5/2008 | Shih | 712/11 |
| 2008/0181285 A1 | 7/2008 | Hwang et al. | |
| 2009/0067530 A1* | 3/2009 | Ashikhmin | 375/267 |
| 2009/0303918 A1* | 12/2009 | Ma et al. | 370/315 |

OTHER PUBLICATIONS

Jafar, S.A., "Fundamental Capacity Limits of Multiple Antenna Wireless Systems," A Dissertation Submitted to the Department of Electrical Engineering and the Committee on Graduate Studies of Stanford University in Partial Fulfillment of the Requirements for the Degree of Doctor of Philosophy, Aug. 2003, 137 pages.

Jindal and Goldsmith, "Capacity and Dirty Paper Coding for Gaussian Broadcast Channels with Common Information," Information Theory, 2004. ISIT 2004. Proceedings. International Symposium, [on-line]. Jun. 27-Jul. 2, 2004 [Retrieved Aug. 3, 2011]. Retrieved from Internet : <URL: http://systems.stanford.edu/docs/jindal_isit04.pdf> 215, 1 page.

Jindal and Goldsmith, "Dirty Paper Coding vs. TDMA for MIMO Broadcast Channels," IEEE International Conference on Communications [online]. Jun. 2004 [Retrieved Aug. 3, 2011]. Retrieved from Internet : <URL: http://www.dtc.umn.edu/publications/reports/2004_57.pdf>, 5 pages.

Palermo N., "A 9 MHz Digital SSB Modulator" Microtelecom [online], Sep. 15, 2002 [retrieved on Dec. 26, 2007]. Retrieved from the Internet< URL: http://www.microtelecom.it/ssbdex/ssbdex-e.htm>, 13 pages.

Rohde & Schwarz, "Introduction to MIMO, Application Note" [online]. 2009, [Retrieved on Aug. 30, 2011]. Retrieved from the Internet:< URL: http://www2.rohde-schwarz.com/file_12364/1MA142_0e.pdf>, 23 pages.

* cited by examiner

*Primary Examiner* — Shaq Taha
(74) *Attorney, Agent, or Firm* — Fish & Richardson P.C.

(57) ABSTRACT

Methods, systems, and apparatus, including computer program products, for implementing interference cancellation across base stations. Communications information for transmitting to a receiving device is received from a first base station at a second base station. At the second base station, second communications information is generated for transmission to the receiving device from the second base station. The second communications information comprises data to reduce interference with the first communications information.

20 Claims, 5 Drawing Sheets

CROSS-CELL MIMO

CROSS-REFERENCE TO RELATED APPLICATIONS

This Application claims priority under U.S.C. §119(e) to U.S. Provisional Application Ser. No. 61/046,694, filed on Apr. 21, 2008, the disclosure of which is incorporated herein by reference.

BACKGROUND

This document relates to interference reduction in communication signals.

Given any particular signal power relative to noise, it is possible to achieve the highest channel capacity by spreading a signal across as much spectrum as possible. Thus, optimal utilization of spectrum may be achieved by spreading a signal across as much spectrum as possible. Optimal channel capacity can be achieved by making a signal as much like Additive White Gaussian Noise as possible. Furthermore, low error rates can be achieved by using Forward Error Correction.

This aspect of spectrum utilization also provides for uncoordinated band allocation in which a signal in the band appears as noise in relation to other signals in the band. Such uncoordinated band allocation results in optimal cumulative spectrum utilization. Utilization can be increased using Multiple-Input, Multiple-Output (MIMO), which uses multiple antennas at both the transmitter and receiver to improve communication performance. MIMO increases spectrum capacity in accordance with the number of transmit antennas and receive antennas above what could otherwise have been achieved because the number of independent channels available in a given spectrum band is increased.

Whether in a MIMO system or other communication system, a wireless device may often receive communications from two or more base stations, e.g., cellular towers. Receiving such multiple communications can cause interference and degrade signal quality.

SUMMARY

In general, one aspect of the subject matter described in this document can be implemented in methods that include the actions of receiving first communications information from a first base station at a second base station and generating second communications information for transmission to the receiving device. The first communications information identifies data for transmission over a channel from the first base station to a receiving device. The second communications information comprises data for transmission from the second base station to the receiving device to reduce interference with the first communications information.

Another aspect of the subject matter described in this document can be implemented in methods that include the actions of identifying a wireless device, determining whether the wireless device is an interference source, and transmitting communications information to one or more base stations, wherein the communications information includes the data sent to the wireless device. Other embodiments of this aspect include corresponding systems, apparatus, and computer program products.

Particular embodiments of the subject matter described in this specification can be implemented to realize the advantage of reducing interference from other base stations within a communications network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document relates to MIMO techniques that can be performed across different communications cells ("cells") in a wireless network. Wireless devices that are located near the border of a cell may receive transmissions from some or all of the base stations that define the neighboring cells. The presence of the transmissions from the neighboring cells can cause interference with the transmissions of the other cells that are communicating with the wireless device. This interference can cause each of the base stations to increase its power output in an attempt to overcome the interference. However, if neighboring base stations are aware of the transmissions that are being sent to the wireless device, this information can be used to coordinate the transmissions of neighboring base stations to a wireless device.

In some implementations, the base stations of a wireless network can be characterized as individual antennas of a MIMO communications system. Accordingly, MIMO communications techniques (e.g., successive interference cancellation) can be used across the cells of the wireless network to reduce the interference from neighboring base stations and coordinate transmissions from the base stations to the wireless device. For example, a base station can provide a neighboring base station with the data that it is transmitting to a particular wireless device. In turn, the neighboring base station can adjust its transmission to the wireless device to reduce the interference experienced by the particular wireless device base station.

Figure 1:
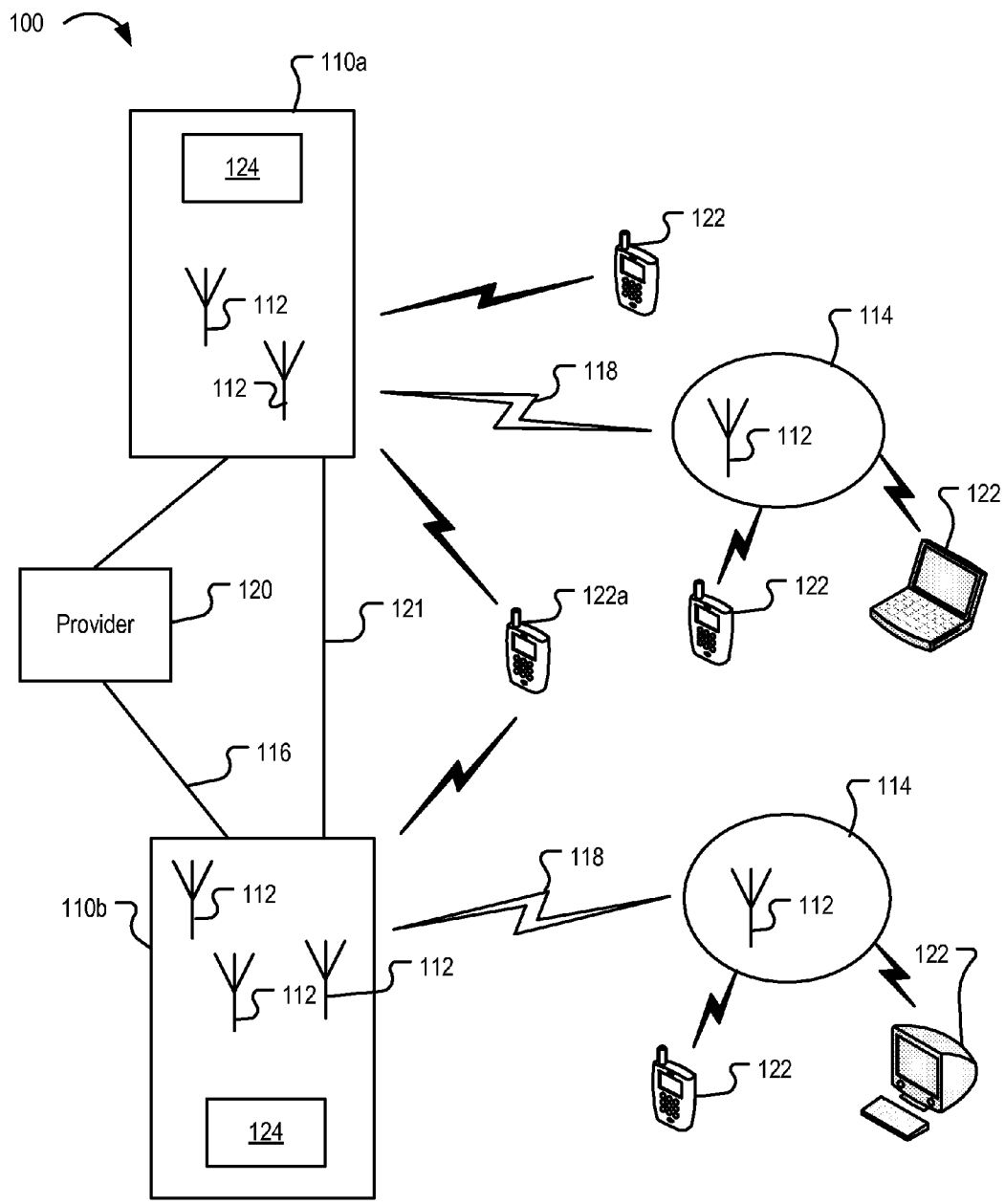
FIG. 1 is a block diagram of an example communications network for utilizing electromagnetic spectrum.

FIG. 1 is a block diagram of a communications network 100 for utilizing electromagnetic spectrum. In some implementations, one or more base stations 110a and 110b can be provided. The base stations 110a and 110b can include access points 112 using a predetermined portion of the electromagnetic spectrum. The access points 112 can be arranged as a Multiple-In, Multiple-Out (MIMO) antenna array, which uses multiple antennas at the transmitter and receiver. In some implementations, the access points 112 can communicate in the 500 MHz-700 MHz spectrum. Although example implementations are described in the context of MIMO systems in this disclosure, other types of communication systems and frequency ranges can also be used.

MIMO technology increases the data throughput and link range through higher spectral efficiency and link diversity.

MIMO systems transmit a data stream on each of the transmit antennas, which increases the overall bandwidth of the system. The data streams associated with a particular antenna are intended for a corresponding receiver antenna. The communications link between the transmitter and the intended receiver is a channel of the MIMO system.

In addition to being received by the intended antenna, data streams transmitted over a channel are also received by the other receiver antennas over different transmission paths. The transmitted data streams intended for a particular antenna can interfere with communications intended for the other receiver antennas. Therefore, interference cancellation techniques are implemented to reduce the effects of the interference and maintain link diversity.

For example, each of the access points 112 can communicate with a wireless device 122 over a wireless link 118 as part of a MIMO array. In a downlink scenario (e.g., transmissions from the base station 110a and 110b to the wireless devices 122), each access point 112 can be a transmit antenna in the MIMO array while each wireless device 122 can be a receive antenna in the MIMO array. Accordingly, an access point 112 can transmit data that are intended for a particular wireless device 122 over a channel (e.g., a link between corresponding antennas) in the MIMO array.

While the transmitted data can be received by the particular wireless device, it can also be received by other wireless devices that are within the range of the access point 112. In turn, the data transmitted on one channel may interfere with the data transmitted on other channels. Therefore, interference cancellation techniques can be used to cancel the interference from an access point that is transmitting data intended for another wireless device.

In an uplink scenario (e.g., transmissions from the wireless devices 122 to the base station 110a and 110b), the wireless devices 122 are the transmit antennas of the MIMO array and the access points are the receive antennas. In this scenario, the transmissions from the wireless devices can similarly cause interference on other channels in the MIMO array. Therefore, interference cancellation techniques can be implemented in an access point 112 to cancel interference from a wireless device 122 that is transmitting data intended for another access point.

In some implementations, multiple base stations 110a and 110b can communicate with each other over a back-link 121. The back-link 121 can be, for example, a dedicated fiber-optic link. Alternatively, the back-link 121 can be, for example, a connection that is created over the Internet. In some implementations, the base stations 110a and 110b can transmit communications information to each other over the back-link 121. For example, a first base station 110a can send information to a second base station 110b identifying the data for transmission from the first base station to wireless devices 122. The second base station 110b can send similar information to the first base station. Accordingly, the base stations 110a and 110b can use the received communications information to implement interference cancellation techniques to cancel interference that a wireless device experiences due to transmissions from the other base station 110b, 110a. In these implementations, the antennas of base stations 110a and 110b can be treated as antennas in a MIMO array.

The base stations 110a and 110b can communicate to a service provider 120 using a fixed communications link, for example, a wide area network, a fiber optic link, a satellite link, or other available link. In some implementations, one or more repeaters 114 can be provided. Each repeater 114 can have one or more access points 112 operating similarly as in the base stations 110a and 110b to improve the range of a communications network 121. In some implementations, the repeaters 114 can be located in a mobile environment (e.g., in a vehicle). In other implementations, the repeaters 114 can be located in a fixed environment (e.g., a building, a residential dwelling, a utility pole).

Wireless devices 122 can communicate to the base stations 110a and 110b or the repeaters 114 to access services provided by a provider 120. The repeaters 114, wireless devices 122 and base stations 110a and 110b can communicate with each other using wireless links 118. Alternatively, a combination of wireless links 118 and fixed links (e.g., wire, fiber) can be used. The repeaters 114 can be spatially arranged according to the propagation characteristics of the spectrum in use, which in the case of the broadcast television spectrum can be approximately 10 km apart. In some implementations, the repeaters 114 and wireless devices 122 can communicate, for example, at 100 mW in the mobile environments and 1 W in fixed environments. Other communication specifications can also be used.

In some implementations, Ultra-Wide-Band (UWB) communications can be performed between the base stations 110a and 110b, repeaters 114 and wireless devices 122 using direct sequence spread spectrum (DSSS), which more nearly approaches the information theoretic ideal of representing a signal by white noise. In other implementations, narrow-band communications can be performed between the base stations 110a and 110b, repeaters 114 and wireless devices 122.

A wireless device 122a can be in communication with two or more base stations 110a, 110b. The communications between the wireless device 122a and each of the base stations 110a, 110b may be characterized as interference by the other base station 110b, 110a. However, this interference can be reduced by characterizing the base stations 110a, 110b as antennas in a MIMO communications system. Accordingly, each base station 110a, 110b can provide the data being sent to the wireless device 122a to the other base station 110b, 110a. In turn, the base stations 110a, 110b can coordinate communications to the wireless device 122a so that the interference is reduced.

In some implementations, the base stations 110a and 110b can include one or more interference cancellation engines 124. The interference cancellation engines 124 are configured to cancel interference experienced by the wireless devices 122 using MIMO communications techniques, as will be discussed below. The interference cancellation engines 124 can be implemented in software that runs on a data processing apparatus, or can be implemented entirely in a special purpose data processing apparatus, e.g., application specific integrated circuits (ASICS), field programmable gate arrays (FPGAs), etc. Other software and/or hardware implementations can also be used.

Figure 2:
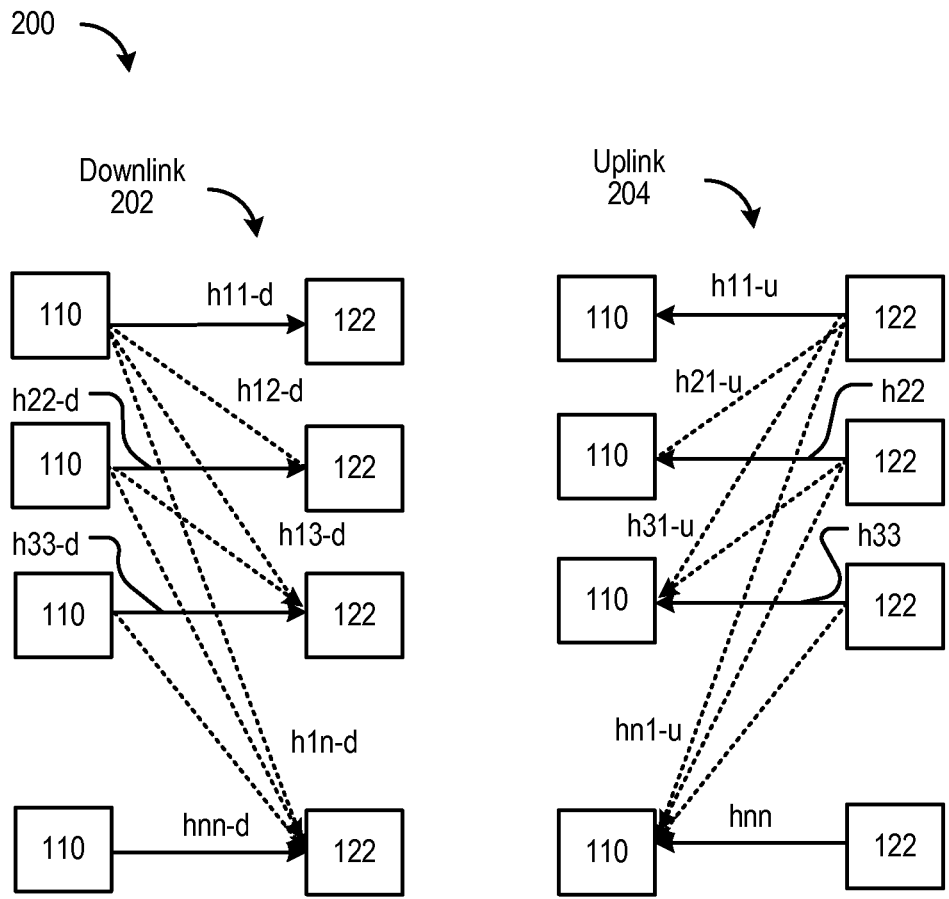
FIG. 2 is a diagram illustrating an example MIMO coordination that can be implemented in the communications network.

FIG. 2 is a diagram illustrating an example MIMO coordination that can be implemented in the communications network 100. In the downlink 202, each antenna associated with the base station 110 transmits communications on different channels. In turn, each antenna associated with the wireless device 122 receives the transmission from a corresponding antenna at the base station 110. For example, the channel hnn-d represents the transmission from antenna n at the base station 110 to antenna n at the wireless device 122. However, the communications transmission on channel hnn-d is subject to interference from the data transmitted by the antennas 1 to n−1 of the base station 110. The interference from communications transmitted on antennas 1 to n−1 can be identified and compensated for in the communications that are received at antenna n. Similarly, in the uplink 204, the interference from the antennas 1 to n−1 associated with the wireless devices 122 can also be identified and compensated for, to accurately recover the communications transmitted on channel hnn-u.

In some implementations, a channel interference cancellation technique can be used to compensate for the interference from data transmitted on separate channels of the MIMO system. The channel interference cancellation technique can be implemented, for example, in the interference cancellation engine 124. In some implementations, the interference cancellation engine 124 can facilitate interference cancellation in a MIMO system implementing spatial multiplexing by subtracting known channel interferers from a select channel transmission.

Spatial multiplexing and interference subtraction can be implemented to provide, for example, the following channel capacity for M×N MIMO (M transmitters, N receivers) with a given bandwidth and signal to noise ration (SNR):

$$C = \min(M, N) * BW * \log_2\left(1 + \frac{\max(M, N)}{\min(M, N)} * SNR\right)$$

The channel interference cancellation can be performed on either the transmit side or the receive side, e.g., precoding for the "broadcast channel" downlink (DL) 202, and decoding for the "multiple access channel" uplink (UL) 204. The precoding and decoding can be performed to reduce interference that a wireless device experiences due to transmissions from other nearby base stations (e.g., across cells) by considering the base stations as antennas in a MIMO array. The data needed to perform the interference cancellation across cells can be received, for example, over a back-link between the base stations, e.g. the first base station 110a and the second base station 110b. The precoding and decoding can be performed, for example, according to the following equations:

$$DL: T_n = X_n - \left(\sum_{i=1}^{n-1} T_i * h_{in}\right) * h_{nn}^{-1}$$

$$UL: Y_n = R_n - \left(\sum_{i=1}^{n-1} Y_i * h_{ni}^{-1}\right) * h_{nn}$$

Where the following table identifies the notations used in the above equations.

| Notation | Meaning |
| --- | --- |
| T | Downlink channel output |
| X | Downlink channel input |
| h | Transfer matrix |
| R | Uplink channel input |
| Y | Uplink channel output |
| n | $n^{th}$ antenna |
| i | $i^{th}$ antenna |

Providing channel interference cancellation in the base station 110 enables a group of wireless devices 122 (e.g., client nodes) that are associated with a select base station to be treated as an array, even without any explicit communication between the wireless devices 122. This is because the base station 110 controls all of the data transmitted on the antennas within the base station 110. Therefore, the base station 110 can identify the interferers from the other antennas and cancel the interference that a select wireless device 122 is experiencing due to transmissions from the other antennas.

Similarly, since the base station 110 receives communications from the wireless devices 122 on the other channels in the MIMO array, the base station 110 can identify the communications received from each of the wireless devices 122. In turn, the base station 110 can remove the interference on the select channel that is caused by the wireless devices 122 operating on the other channels. Accordingly, the interference experienced on the select channel from other channels can be subtracted from the communications that are being sent to a select wireless device. While an example channel interference cancellation technique distributed across bases stations 110a and 110b is provided, other channel interference cancellation techniques distributed across two or more base stations can also be used (e.g., successive interference cancellation for a MIMO system).

Figure 3:
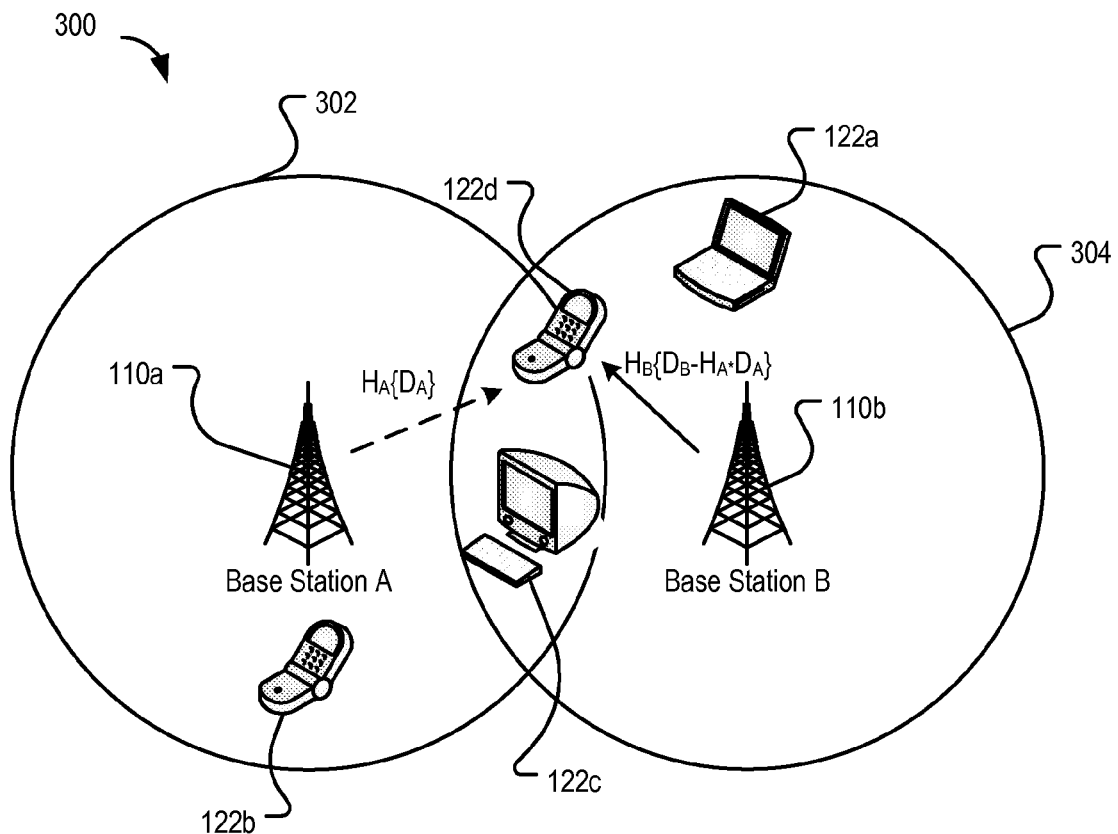
FIG. 3 is a block diagram of another example communications network.

FIG. 3 is a block diagram illustrating another example communications network 300. The communications network 300 can include multiple base stations. The base stations can communicate with wireless devices. The wireless devices can be mobile nodes 122b, 122d, 122a (e.g., smart devices, laptop computers, etc). Alternatively, the wireless devices can be stationary nodes 122c (e.g., desktop computers, repeaters, etc).

Each base station has a defined region within which the base station can communicate with the wireless devices. For example, base station A 110a has a defined region 302 within which it can communicate with wireless devices 122b-d. Similarly, base station B 110b has a defined region 304 within which it can communicate with wireless devices 122a, 122c and 122d. The defined regions 302, 304 are determined in part by a combination of the electrical characteristics of the base stations and wireless devices as well as the environmental conditions and regulations.

In some situations, wireless devices can be located in more than one defined region at the same time. For example, in FIG. 3 wireless devices 122c, 122d are located within both defined regions 302, 304. Accordingly, both base station A 110a and base station B 110b can communicate with wireless devices 122c, 122d. However, as each base station 110a and 110b attempts to communicate with the wireless devices 122c, 122d, both base stations 110a and 110b may continue to increase their respective power output to compensate for interference. This power increase can continue until each base station 110a and 110b is transmitting at maximum power. As each of the base stations 110a and 110b increases its power it creates more interference with the communications from the other base station 110a and 110b, potentially resulting in neither base station 110a and 110b being able to communicate with the wireless devices 122c, 122d.

In some implementations, communications can be coordinated among the base stations and the interference from neighboring base stations can be cancelled when a wireless device is between base stations. This coordination and interference cancellation can be accomplished, for example, by treating each base station as part of a MIMO array and performing a channel interference cancellation technique across multiple base stations.

The coordination between neighboring base stations can be defined, for example, according to a signal to interference plus noise (SINR) analysis that determines whether a base station should increase its power or reduce interference from the neighboring base station.

In some implementations, a SINR optimization can be performed by the base stations, for example, according to the following SINR optimization formula:

$$\max SINR = \frac{P_s}{N_o + \Sigma P_I - \Sigma P_c}$$

where
$P_s$=SignalPower
$P_c$=InterferencePower
$N_o$=BackgroundNoise and
$\Sigma P_I$=TotalInterference In some implementations, the optimization can take place based on a power constraint (K). The power constraint can be represented by the following relationship:

$K=P_s+\Sigma P_c$

Using this relationship between the power constant (K), the signal power (Ps) and the Interference Power (Pc), the base stations can determine whether to increase their transmission power or reduce interference, for example, according to the following rules:
if $K<N_o+\Sigma P_I$ then, $$\max SINR = \frac{K}{N_o + \Sigma P_I}$$

when $P_s=K$ so the base station will maximize SINR by allocating as much power as possible to increasing the signal power.
However, if $K>N_o+\Sigma P_I$ then $$\max SINR = \frac{K - \Sigma P_I}{N_o}$$

when $P_s=K-\Sigma P_I$ so the base station will maximize SINR by allocating as much power as possible to reducing the interference power.

Thus, according to the example SINR optimization routine above, when the power constraint is less than a threshold (e.g., the sum of noise and interference), power will be allocated to strengthen the signal transmitted by the base station. In contrast, when the power constraint is greater than the threshold, all of the available power will be allocated to reduce the interference from the neighboring base station. The SINR analysis demonstrated above is one example of an optimization routine that can be performed to coordinate neighboring base stations, but other optimization routines can be used.

To cancel interference from other base stations, the select base station can identify the data that are being received by the wireless device from the other base stations. The select base station can identify the data by receiving communications information from the other base stations. The communications information can be received over a network connection between the select base station and the other base stations. In some implementations, the network connection can be, for example, a dedicated OC-192 fiber back-link. Alternatively, other back-links can be used (e.g., wide area network, local area network, the Internet, RF communications, etc.).

When a neighboring base station receives a pilot signal from a new wireless device that is not part of its communications network, it may identify the wireless device as an interference source. In response, the neighboring node can send communications information to the select node that will enable the select node to cancel the interference from the neighboring node when the select node communicates with the wireless device.

For example, referring again to FIG. 3, if base station A 110a receives a pilot signal from wireless device 122d, base station A 110a can transmit a transfer function ($H_a$) to the wireless device 122d. The transfer function ($H_a$) is derived from the pilot signal and data ($D_a$) that base station A 110a sends in the back-link to base station B 110b. In turn, base station B 110b reduces the interference that is experienced by wireless device 122d due to the transmission of base station A 110a. Base station B 110b reduces the interference by subtracting the data associated with base station A 110a from the data ($D_b$) that it transmits to the wireless device 122d (e.g., $D_b - H_a * D_a$).

There should be sufficient bandwidth in the back-link to transfer the data ($D_a$) and transfer function ($H_a$) from the neighboring base station to the select base station, prior to the transmission of the data ($D_b$) to the wireless device. Therefore, a minimum back-link bandwidth can be determined and maintained to ensure that the data ($D_a$) and transfer function ($H_a$) arrive prior to transmission of the data ($D_b$).

A bandwidth optimization determination can be performed, for example, to identify the minimum back-link bandwidth required to deliver data from the neighboring base stations to the select base station prior to transmission of data to the wireless devices by the select base station. For example, in some implementations, bandwidth is minimized when the following are true:

$$\forall i \in [1, M] \qquad \sum_t f^i(t) = D_i$$

$$\forall i \in [1, M+N] \qquad \sum_t f^i(t) \le c(t) * T_s$$

$$\forall i \in [1, M] \qquad \sum_{t>(i+N_d-T_p-T_g) \cup t<i} f^i(t) = 0$$

$$\forall i \in [1, M+N] \qquad c(t) \le BW$$

$$\forall i, t \qquad \sum_t f^i(t) = D_i$$

The above formulations are based on the following assumptions:
i) All data generated in symbol i is transmitted to the desired base station.
ii) In any slot, the amount of data transmitted from all symbols should be less than the capacity.
iii) Data is not sent if the transmission exceeds the delay bound ($I+N_d-T_p-T_g$).
iv) All possible capacities are less than the upper bound.
v) All possible capacities are non-negative.

Where the following table identifies the notations used in the above formulations.

| Notation | Meaning | Units |
|---|---|---|
| M | Number of symbols in the uplink | NA |
| N | Number of symbols in the downlink | NA |
| $A_i$ | Data generated in symbol i | Bit/second |
| $H_i$ | Transfer Function generated in symbol i | Bit/second |
| $I_i$ | Node ID generated in symbol i | Bit/second |
| $N_s$ | Number of "interference sources" considered | NA |
| $D_i$ | Total data generated in symbol i | Bit |
| $F^i(t)$ | Amount of data generated in symbol i and transmitted in symbol t | Bit |
| c(t) | Backlink capacity at symbol t | Bit/second |
| $T_p$ | Process Time | Second |
| $T_g$ | Propagation Delay | Second |
| $T_s$ | Symbol Time | Second |
| $N_d$ | Mind distance between uplink and downlink for a client in dynamic scheduling | NA |
| BW | Upper bound of the link capacity | Bit/second |

In the optimization above, the data from the neighboring base station will arrive before the select base station sends data to the wireless device in the downlink. However, in order to reduce potential delay, the base station can alternatively send interference data to its neighbors as soon as it decodes the pilots and then continue to send interference data sequentially. Additionally, the back-link capacity can be treated as fixed so that the data generated in each symbol is substantially constant. An example bandwidth optimization determination has been provided, but other bandwidth optimization techniques can be used to ensure that the select base station receives the interference data prior to transmitting data to the wireless device.

To reduce the minimum bandwidth the base stations can identify wireless devices that are proximate to a communications border and transmit only the data required to cancel the interference experienced by these wireless devices. For example, in FIG. 3 base station A 110a could send the information required for base station B 110b to cancel the interference from base station A 110a experienced by all wireless devices 122a, 122c, 122d within the defined region 304.

However, the wireless device 122a that is only in defined region 304 will not experience the same level of interference from base station A 110a as the wireless devices 122c, 122d that are in both defined regions 302, 304. Therefore, base station A 110a can elect to send only the data needed to cancel the interference experienced by wireless devices 122c, 122d that are in both defined regions 302, 304. This reduces the amount of data that base station A 110a is required to send and, in turn, also reduces the minimum bandwidth required in the back-link.

In some implementations, to determine whether a wireless device is near a communications border, the base station can identify the locations of the wireless devices. For example, base stations can use triangulation to determine the location of the wireless device. Alternatively, base stations can use global positioning satellite (GPS) information to identify the location of wireless devices that are equipped with GPS transmitters. Other wireless device location methods can also be used (e.g., received signal strength indicators). The base station can determine whether the wireless device is near a communications border by comparing the location of the wireless device to information that characterizes the communications borders.

In some implementations, the base stations are provided information that characterizes the communications borders (e.g., identifies proximate base stations). For example, if a single service provider installs the select node and all of the proximate communication nodes then the service provider can provide information about the proximate nodes to the select node to enable communications between the nodes.

In other implementations, the base stations may be required to identify proximate base stations on an ad hoc basis. This situation can arise, for example, when different entities (e.g., service providers) install independent base stations in a particular area and do not provide information about their base stations. The base stations can identify proximate base stations by detecting pilot signals from the proximate base stations. Based on the information contained in the pilot signal, the base stations can successfully exchange communications information with the proximate base stations.

Figure 4:
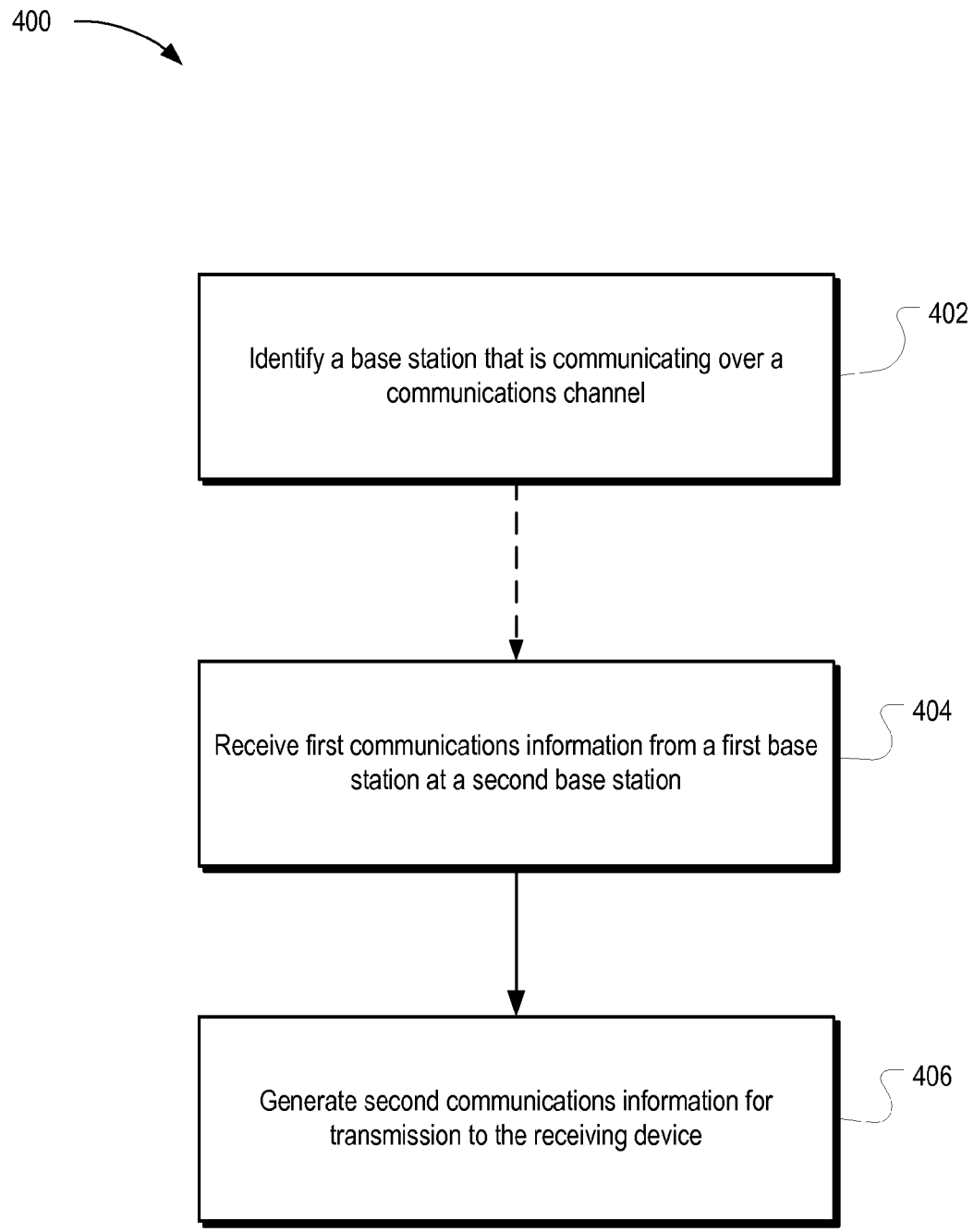
FIG. 4 is a flow chart illustrating an example method for canceling interference from base stations.

FIG. 4 is a flow chart illustrating an example method 400 for canceling interference across communications cells. In some implementations, the method 400 can optionally identify a base station that is communicating over a communications channel (402). The base station can be identified, for example, by a select base station that does not have information identifying base stations that are communicating over the one or more channels. Accordingly, the base station may determine the proximate base stations that are proximately located on an ad hoc basis. In some implementations, the base stations can be identified, for example, by detecting pilot signals associated with the base stations.

The method 400 receives first communications information from a first base station at a second base station (404). The communications can be received, for example, over a fiber-optic back-link that connects the first base station and the second base station. In some implementations, the first communications information can identify data for transmission over a channel from the first base station to a receiving device. In some implementations, the first communications information can also include a transfer function associated with the data.

In some implementations, the communications can be communications on a select channel in a MIMO communications system. The communications can be received, for example, by a select base station that is communicating with a select wireless device.

The method 400 continues by generating second communications information for transmission to the receiving device from the second base station (406). The second communications information can be data that reduces interference with the first communications information. For example, the interference can be reduced by subtracting the product of the data and the transfer function from the data for transmission by the second base station.

Figure 5:
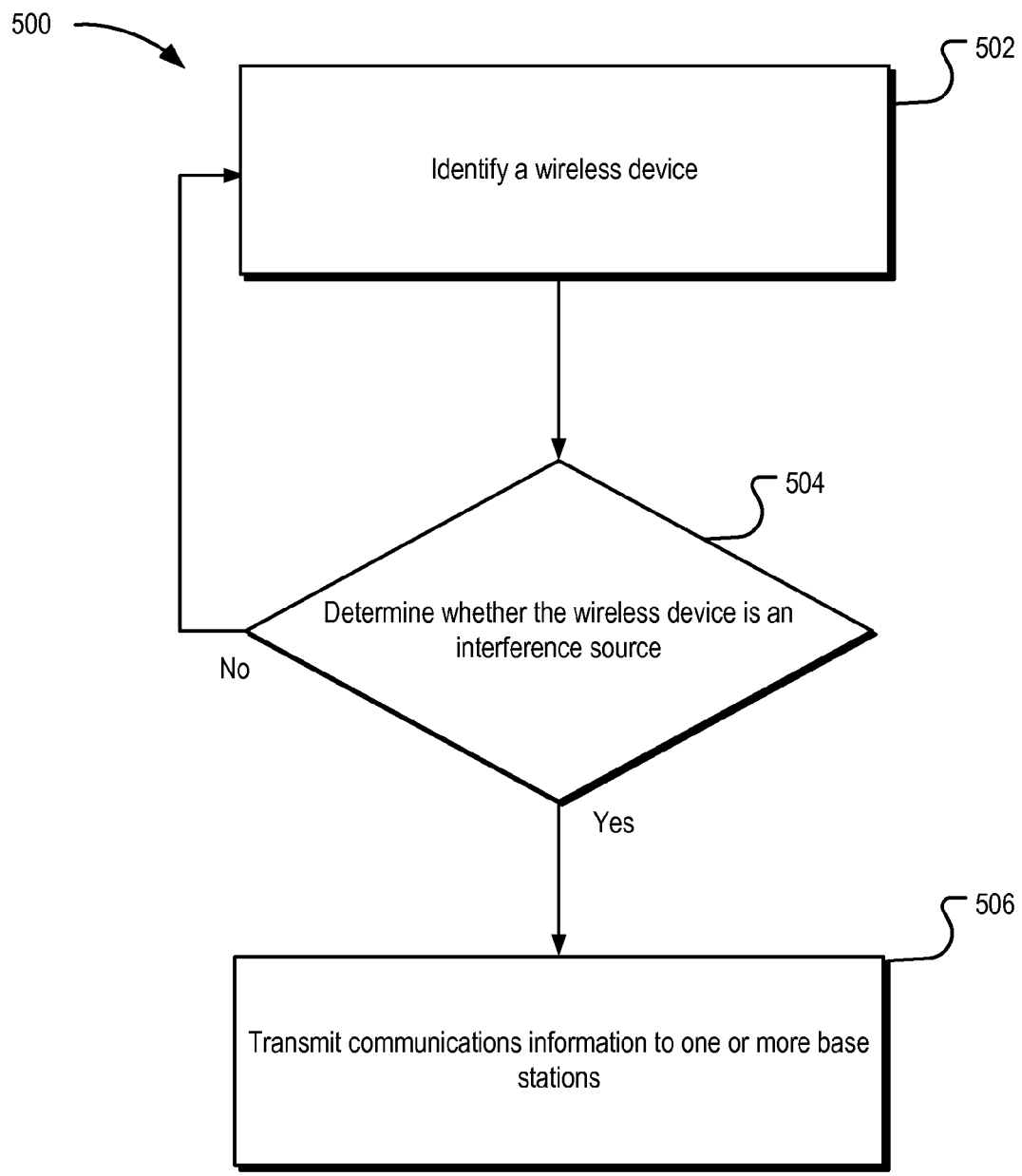
FIG. 5 is a flow chart illustrating an example method for providing interference information to base stations.

FIG. 5 is a flow chart illustrating an example method 500 for providing interference information to base stations. The method 500 begins by identifying a wireless device (502). The wireless device can be identified for example by a base station that is part of a communications network. In some implementations, the wireless device is identified in response to receiving a pilot signal from the wireless device.

The method 500 continues by determining whether the wireless device is an interference source (504). The wireless device can be identified as an interference source, for example, by determining if the wireless device is receiving communications from other base stations. In some implementations, the wireless device can be determined to be receiving communications from other base stations based on its location. For example, if the wireless device is proximate to a communications border, then it will likely be receiving communications from other base stations in the communications network.

In response to determining that the wireless device is an interference source, the method 500 continues by transmitting communications information to one or more base stations (506). The communications information can contain the data for transmission to the wireless device as well as a transfer function associated with the data that are sent to the wireless device. In some implementations, the one or more base stations can be nodes that are proximately located to the base station.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of performing cross-cell MIMO, comprising:
    establishing, at a first base station, a first wireless data connection with a receiving device;
    identifying a second base station remote from the first base station that is transmitting data to the receiving device over a second wireless data connection;
    receiving, at the first base station and as having been sent from the second base station, first communications information that characterizes a transmission from the second base station to the receiving device, wherein the first communications information includes first data that is to be processed by the receiving device and a transfer function used, by the second base station, to transmit the first data to the receiving device;
    generating second communications information for transmission, from the first base station to the receiving device, of second data that is to be processed by the receiving device, the second communications information being generated using the first data, the second data, and the transfer function, wherein the second communications information is generated, in part, to reduce interference imposed on the second communications information by the first communications information, wherein generating the second communications information comprises subtracting, from the second data, a result of an operation based on the first data and the transfer function; and
    transmitting, from the first base station, the second communications information to the receiving device.

2. The method of claim 1, further comprising:
    establishing a communication link between the first base station and the second base station in response to the identification of the second base station;
    wherein the first communications information is received at the first base station over the communications link.

3. The method of claim 2, wherein identifying the second base station comprises detecting a pilot signal associated with the second base station.

4. The method of claim 1, wherein the result of the operation based on the first data and the transfer function comprises a product of the first data and the transfer function.

5. The method of claim 1, wherein receiving the first communications information comprises receiving the first communications information over a back-link.

6. The method of claim 5, wherein receiving the first communications information over a back-link comprises receiving the first communications information over a fiber-optic link.

7. The method of claim 1, further comprising determining a location of a wireless device, wherein generating second communications information comprises generating the second communications information based on the location of the wireless device.

8. The method of claim 7, wherein the location is proximate to a communications border.

9. The method of claim 1, further comprising defining a MIMO array, wherein the MIMO array comprises the first base station and the second base station.

10. A cross-cell MIMO system, comprising:
    a first base station that:
    establishes a first wireless data connection with a receiving device;
        identifies a second base station remote from the first base station that transmits data to the receiving device over a second wireless data connection;
    receives, from the second base station, first communications information that characterizes a transmission from the second base station to the receiving device, wherein the first communications information includes first data that is to be processed by the receiving device and a transfer function that is used, by the second base station, to transmit the first data to the receiving device; and
    transmits second communications information to the receiving device;
    an interference cancellation engine configured to generate the second communications information for transmission, from the first base station to the receiving device, of second data that is to be processed by the receiving device, the second communications information being generated using the first data, the second data, and the transfer function, wherein the second communications information is generated, in part, to reduce interference imposed on the second communications information by the first communications information, wherein the interference cancellation engine is further configured to generate the second communications information by subtracting, from the second data, a result of an operation based on the first data and the transfer function.

11. The system of claim 10, wherein the first base station is configured to identify a location of one or more wireless devices, and the interference cancellation engine is further configured to generate the second communications information based on the identified location.

12. The system of claim 10, wherein the first base station and the second base station comprise a MIMO array.

13. The system of claim 10, wherein the first base station is configured to identify a location of one or more wireless devices, and the interference cancellation engine is configured to selectively reduce interference based on the location of the one or more wireless devices.

14. The system of claim 13, wherein the interference cancellation engine is configured to reduce interference from the second base station in response to the one or more wireless devices being located in a defined region.

15. The system of claim 14, wherein the defined region comprises an area proximate to a communications border.

16. A cross-cell MIMO device, comprising:
a transceiver to establish, at a first base station, a first wireless data connection with a receiving device;
one or more tangible recordable storage media storing instructions that, when executed by one or more processors, perform operations comprising:
identifying a second base station remote from the first base station that is transmitting data to the receiving device over a second wireless data connection;
receiving, at the first base station and as having been sent from the second base station, first communications information that characterizes a transmission from the second base station to the receiving device, wherein the first communications information includes first data that is to be processed by the receiving device and a transfer function that is used, by the second base station, to transmit the first data to the receiving device;
generating second communications information for transmission, from the first base station to the receiving device, of second data that is to be processed by the receiving device, the second communications information being generated using the first data, the second data, and the transfer function, wherein the second communications information is generated, in part, to reduce interference imposed on the second communications information by the first communications information, wherein generating the second communications information comprises subtracting, from the second data, a result of an operation based on the first data and the transfer function; and
a transceiver for transmitting, from the first base station, the second communications information to the receiving device.

17. The method of claim 1, further comprising:
determining that the second base station is an interference source for the receiving device; and
in response to determining that the second base station is an interference source for the receiving device, transmitting the second communications information to the receiving device.

18. The method of claim 17, wherein:
receiving the first communications information comprises receiving the first communications information over a back-link that communicably couples the first base station to the second base station; and
transmitting the second communications information to the receiving device comprises transmitting the second communications information over a wireless communications channel that is different than the back-link.

19. The method of claim 1, further comprising:
determining that the receiving device is proximate to a communications border between a communications range of the first base station and a communications range of the second base station; and
in response to determining that the receiving device is proximate to the communications border, transmitting the second communications information to the receiving device.

20. The method of claim 1, further comprising:
determining that a power constraint is less than a threshold value, the power constraint being based on signal power of the first base station and interference power of the first base station; and
in response to determining that the power constraint is less than the threshold value, increasing the signal power of the first base station.

\* \* \* \* \*